(12) United States Patent
Cariou et al.

(10) Patent No.: US 10,506,530 B2
(45) Date of Patent: Dec. 10, 2019

(54) METHODS TO INDICATE TRANSMIT POWER ENVELOPE RESTRICTIONS FOR WIRELESS LOCAL AREA NETWORK (WLAN) OPERATION IN UNLICENSED SPECTRUM

(71) Applicant: Intel IP Corporation, Santa Clara, CA (US)

(72) Inventors: Laurent Cariou, Portland, OR (US); Po-Kai Huang, San Jose, CA (US); Necati Canpolat, Beaverton, OR (US); Ehud Reshef, Kiryat Tivon (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/376,798

(22) Filed: Apr. 5, 2019

(65) Prior Publication Data
US 2019/0253984 A1    Aug. 15, 2019

Related U.S. Application Data

(60) Provisional application No. 62/653,024, filed on Apr. 5, 2018, provisional application No. 62/662,328, filed on Apr. 25, 2018.

(51) Int. Cl.
*H04W 52/36* (2009.01)
*H04W 16/14* (2009.01)
*H04W 88/08* (2009.01)

(52) U.S. Cl.
CPC ............ *H04W 52/36* (2013.01); *H04W 16/14* (2013.01); *H04W 88/08* (2013.01)

(58) Field of Classification Search
CPC ..... H04W 52/34; H04W 84/12; H04W 16/14; H04W 88/08
See application file for complete search history.

(56) References Cited

U.S. PATENT DOCUMENTS

2015/0146548 A1*  5/2015  Wang .................... H04W 52/04
                                                              370/252

* cited by examiner

*Primary Examiner* — Keith Ferguson
(74) *Attorney, Agent, or Firm* — Schwegman Lundberg & Woessner P.A.

(57) ABSTRACT

Embodiments of a high efficiency (HE) access point (HE AP) and HE station (HE STA) are generally described herein. The HE AP may transmit a frame that includes a transmit power envelope element to indicate local maximum transmit power constraints for an operating bandwidth of the HE AP on a per-segment basis. The operating bandwidth may be configurable for division into segments of a configurable segment size. The transmit power envelope element may include: a transmit power information field that includes: a local maximum transmit power count subfield that indicates the operating bandwidth, and a segment size subfield that indicates the segment size; and for each of the segments, a local maximum transmit power per segment field that indicates a local maximum transmit power for the segment.

20 Claims, 14 Drawing Sheets

Transmit Power Information field

Restriction report element or attribute

Format for restriction report control field

Format for per segment info field

Restriction report element or attribute

Format for restriction report control field

Format for per segment info field

US 10,506,530 B2

METHODS TO INDICATE TRANSMIT POWER ENVELOPE RESTRICTIONS FOR WIRELESS LOCAL AREA NETWORK (WLAN) OPERATION IN UNLICENSED SPECTRUM

PRIORITY CLAIM

This application claims priority under 35 USC 119(e) to U.S. Provisional Patent Application Ser. No. 62/653,024, filed Apr. 5, 2018, and to U.S. Provisional Patent Application Ser. No. 62/662,328, filed Apr. 25, 2018, all of which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to methods, computer readable media, and apparatus for indication of transmit power envelope restrictions.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
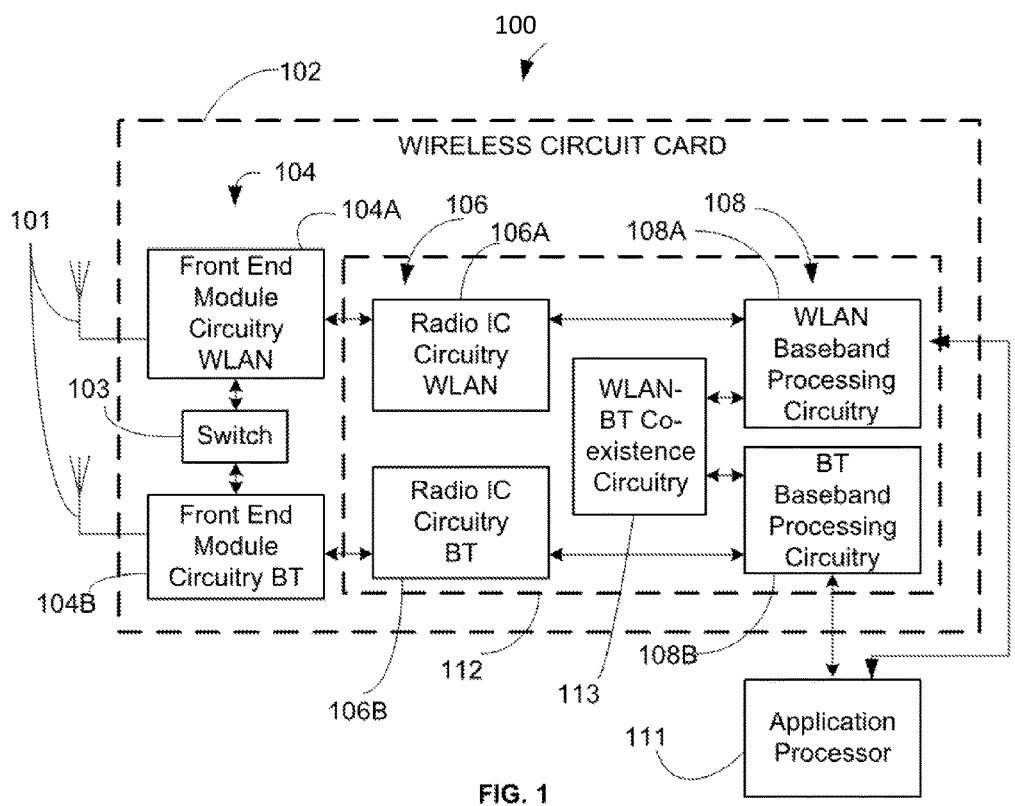
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
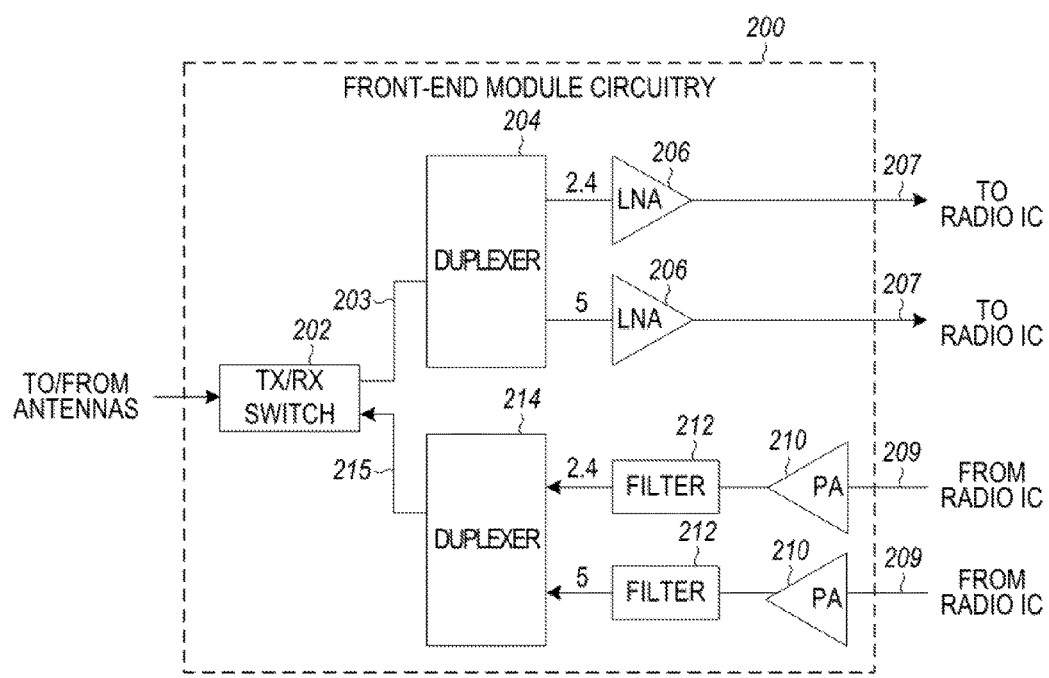
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
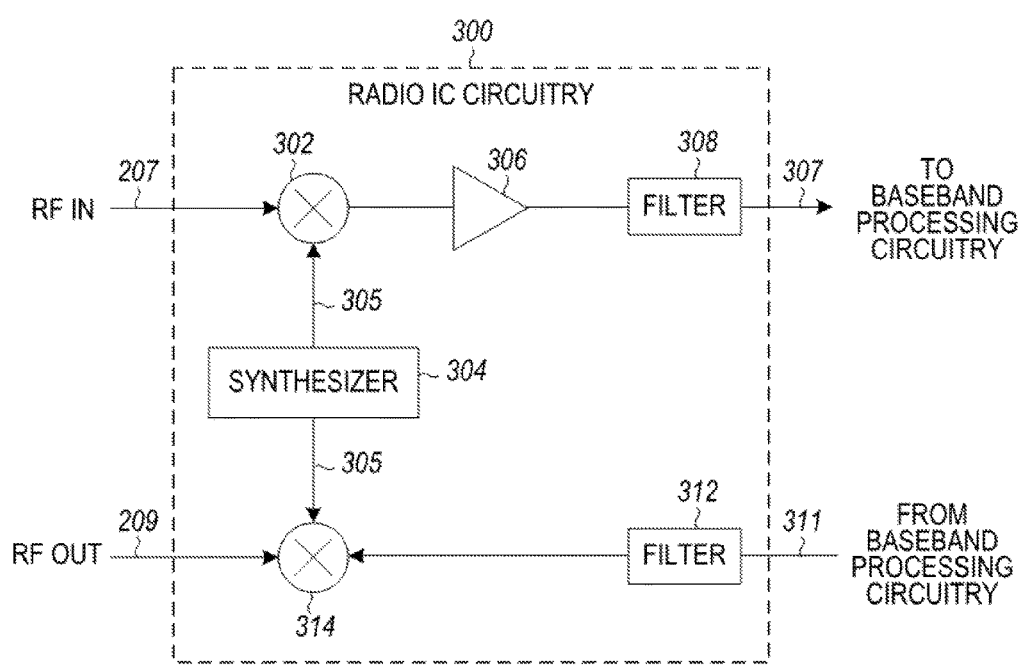
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
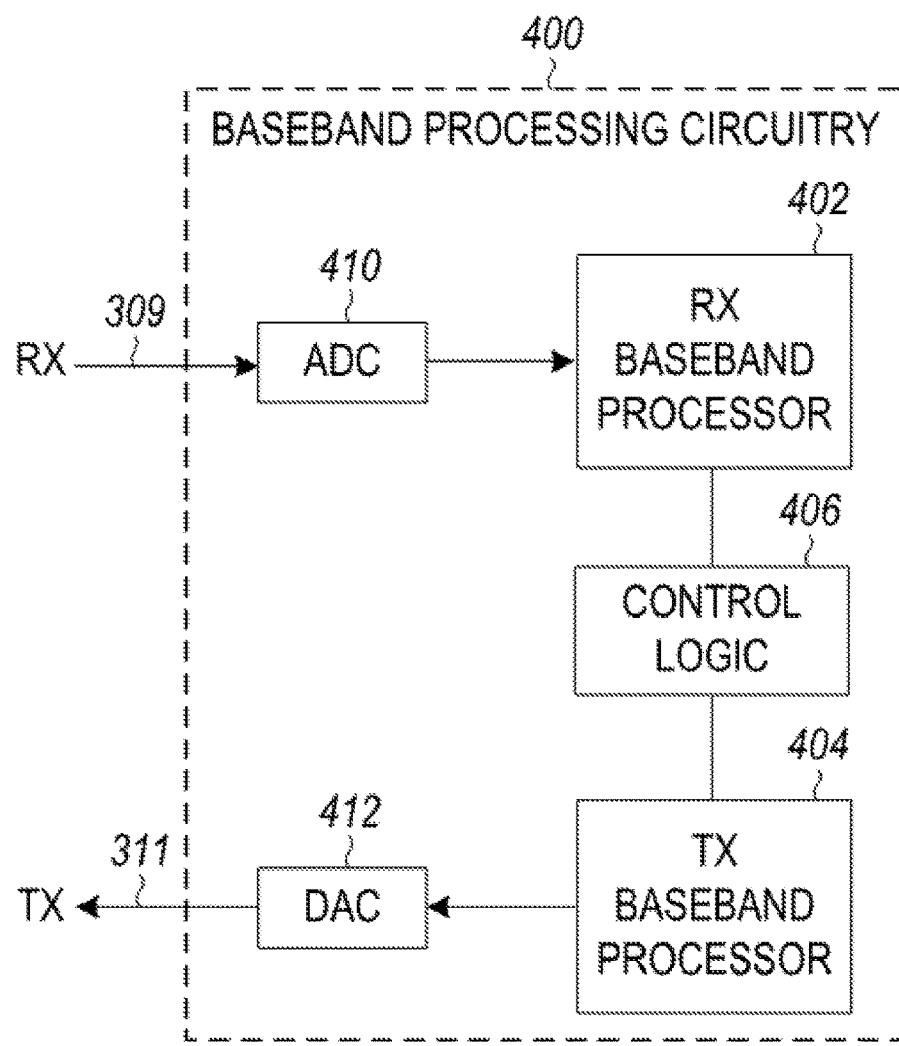
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
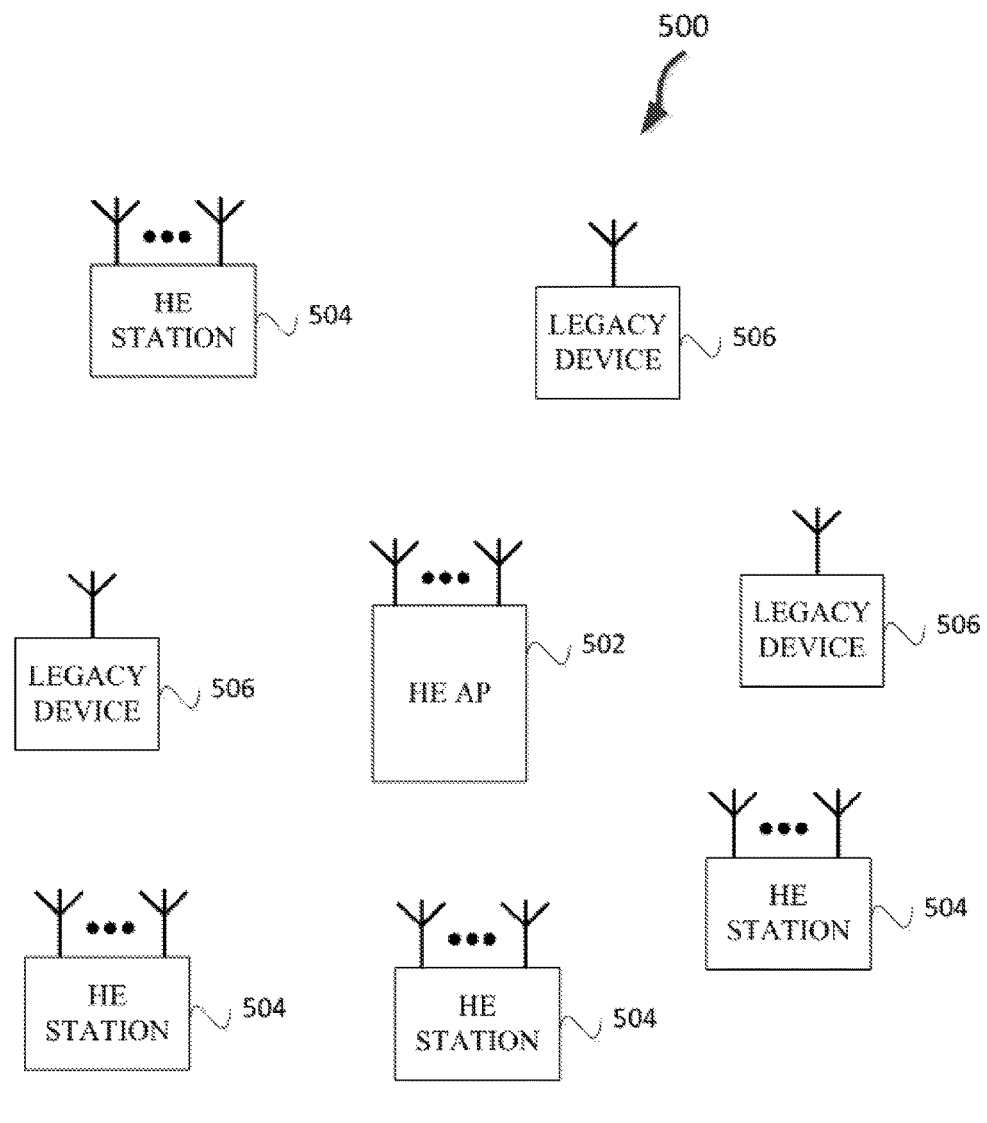
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be an AP, a plurality of high-efficiency wireless (e.g., IEEE 802.11ax) (HE) stations 504, and a plurality of legacy (e.g., IEEE 802.11n/ac) devices 506.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE AP 502 that is part of an extended service set (ESS). A controller (not illustrated) may store information that is common to the more than one HE APs 502.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g, IEEE 802.11ax embodiments, a HE AP 502 may operate as a master station which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE master-sync transmission, which may be a trigger frame or HE control and schedule transmission, at the beginning of the HE control period. The HE AP 502 may transmit a time duration of the TXOP and sub-channel information. During the HE control period, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE control period, the HE AP 502 may communicate with HE stations 504 using one or more HE frames. During the HE control period, the HE STAs 504 may operate on a sub-channel smaller than the operating range of the HE AP 502. During the HE control period, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.11mc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-17.

In example embodiments, the HE station 504 and/or the HE AP 502 are configured to perform the methods and operations/functions described herein in conjunction with FIGS. 1-17. In example embodiments, an apparatus of the HE station 504 and/or an apparatus of the HE AP 502 are configured to perform the methods and functions described herein in conjunction with FIGS. 1-17. The term Wi-Fi may refer to one or more of the IEEE 802.11 communication standards. AP and STA may refer to HE access point 502 and/or HE station 504 as well as legacy devices 506.

In some embodiments, a HE AP STA may refer to a HE AP 502 and a HE STAs 504 that is operating a HE APs 502. In some embodiments, when an HE STA 504 is not operating as a HE AP, it may be referred to as a HE non-AP STA or HE non-AP. In some embodiments, HE STA 504 may be referred to as either a HE AP STA or a HE non-AP.

Figure 6:
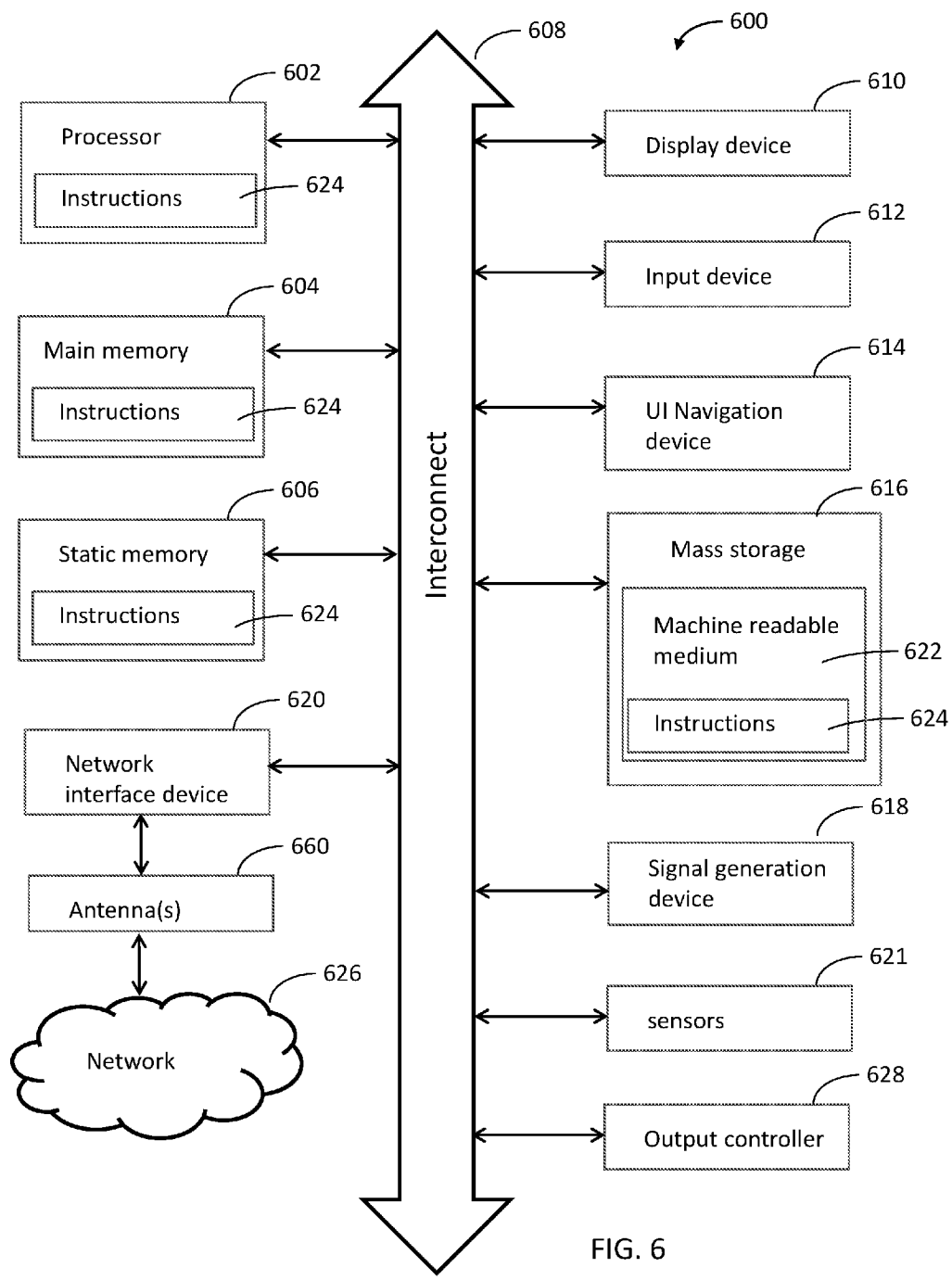
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, HE station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
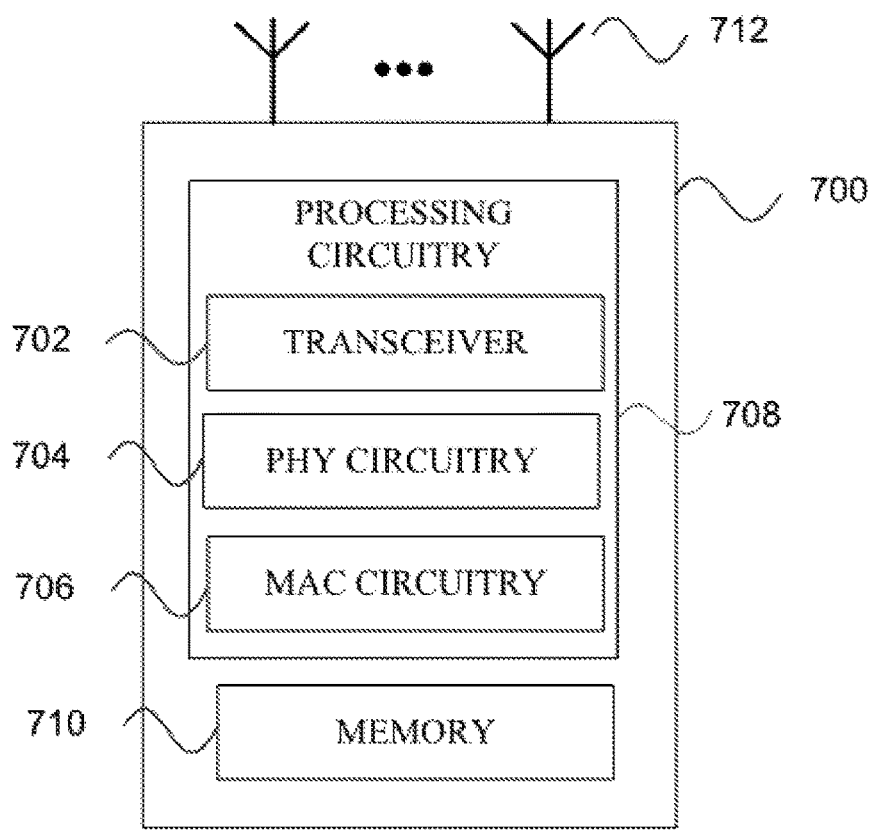
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 700 may be a HE STA 504 and/or HE AP 502 (e.g., FIG. 5). A HE STA 504 and/or HE AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

In accordance with some embodiments, the HE AP 502 may encode a frame for transmission. The frame may be encoded to include a transmit power envelope element to indicate local maximum transmit power constraints for an operating bandwidth of the HE AP 502 on a per-segment basis. The operating bandwidth may be configurable for division into segments of a configurable segment size. The operating bandwidth of the HE AP 502 may be in a 6 GHz operating frequency band. The HE AP 502 may encode the transmit power envelope element to include: A) a transmit power information field that includes: a local maximum transmit power count subfield that indicates the operating bandwidth, and a segment size subfield that indicates the segment size; and B) for each of the segments, a local maximum transmit power per segment field that indicates a local maximum transmit power for the segment. The HE AP 502 may transmit a trigger frame (TF) that schedules a trigger-based (TB) HE Physical Layer Convergence Procedure (PLCP) Protocol Data Unit (PPDU) from an HE STA 504 within the operating bandwidth. The HE AP 502 may receive the TB HE PPDU from the HE STA 504 in response to the TF. The TB HE PPDU may be received by the HE AP 502 within the operating bandwidth. These embodiments are described in more detail below.

Figure 8:
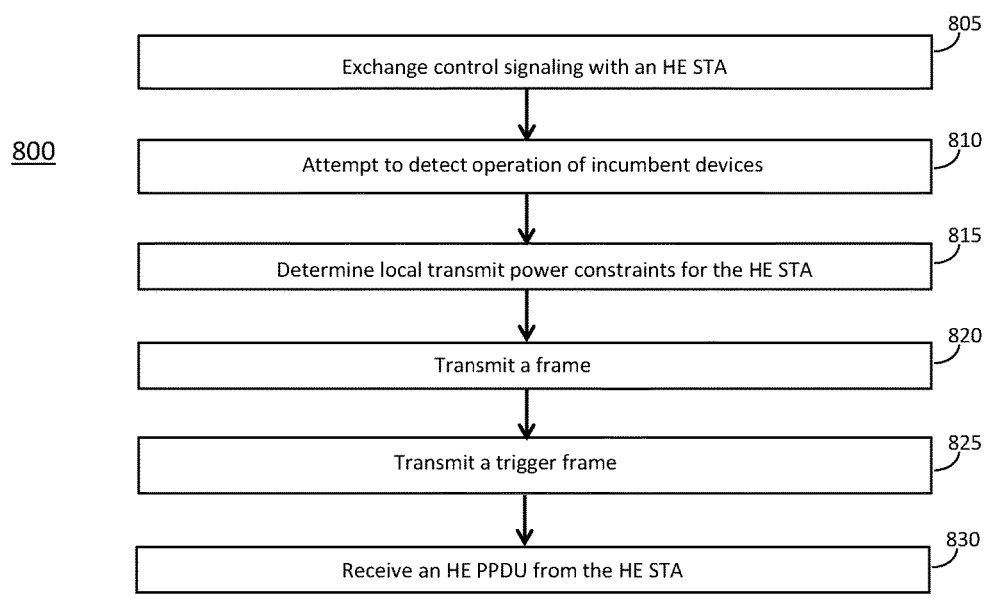
FIG. 8 illustrates the operation of a method in accordance with some embodiments.
Figure 9:
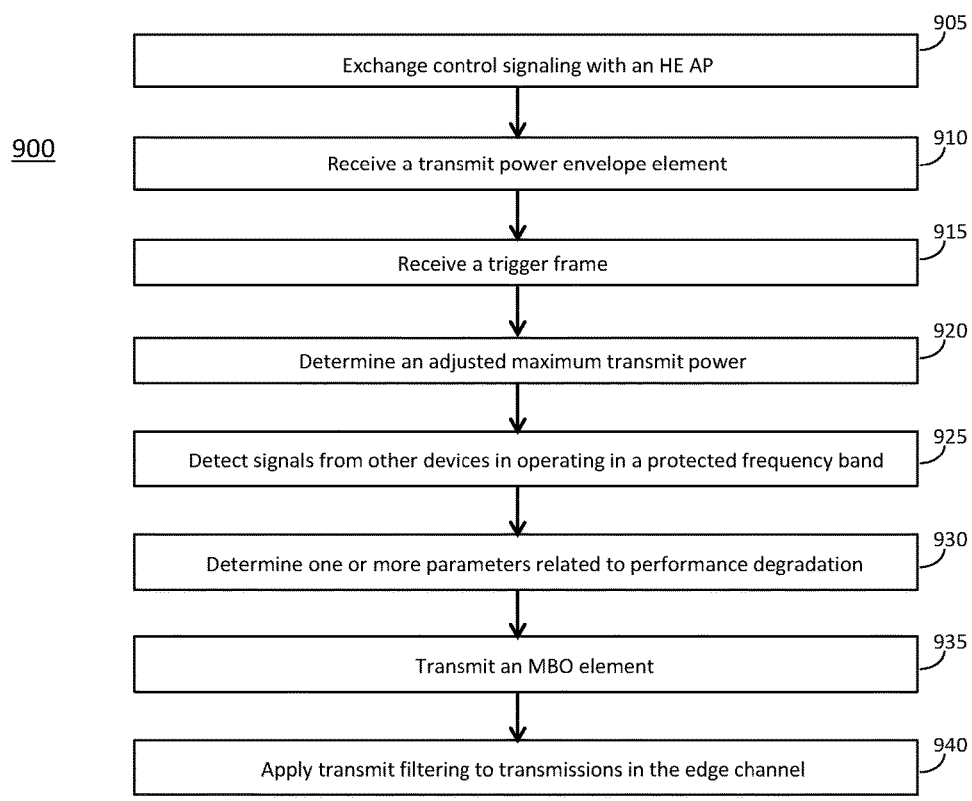
FIG. 9 illustrates the operation of another method in accordance with some embodiments.

FIG. 8 illustrates the operation of a method of communication in accordance with some embodiments. FIG. 9 illustrates the operation of another method of communication in accordance with some embodiments. It is important to note that embodiments of the methods 800, 900 may include additional or even fewer operations or processes in comparison to what is illustrated in FIGS. 8-9. In addition, embodiments of the methods 800, 900 are not necessarily limited to the chronological order that is shown in FIGS. 8-9. In describing the methods 800, 900, reference may be made to one or more figures, although it is understood that the methods 800, 900 may be practiced with any other suitable systems, interfaces and components.

In some embodiments, an HE AP 502 may perform one or more operations of the method 800, but embodiments are not limited to performance of the method 800 and/or operations of it by the HE AP 502. In some embodiments, another device and/or component may perform one or more operations of the method 800. In some embodiments, another device and/or component may perform one or more operations that may be similar to one or more operations of the method 800. In some embodiments, another device and/or component may perform one or more operations that may be reciprocal to one or more operations of the method 800. In a non-limiting example, the HE STA 504 may perform an operation that may be the same as, similar to, reciprocal to and/or related to an operation of the method 800, in some embodiments.

In some embodiments, an HE STA 504 may perform one or more operations of the method 900, but embodiments are not limited to performance of the method 900 and/or operations of it by the HE STA 504. In some embodiments, another device and/or component may perform one or more operations of the method 900. In some embodiments, another device and/or component may perform one or more operations that may be similar to one or more operations of the method 900. In some embodiments, another device and/or component may perform one or more operations that may be reciprocal to one or more operations of the method 900. In a non-limiting example, the HE AP 502 may perform an operation that may be the same as, similar to, reciprocal to and/or related to an operation of the method 900, in some embodiments.

It should be noted that one or more operations of one of the methods 800, 900 may be the same as, similar to and/or reciprocal to one or more operations of the other method. For instance, an operation of the method 800 may be the same as, similar to and/or reciprocal to an operation of the method 900, in some embodiments. In a non-limiting example, an operation of the method 800 may include transmission of an element (such as a frame, block, message and/or other) by the HE AP 502, and an operation of the method 900 may include reception of a same element (and/or similar element) by the HE STA 504. In some cases, descriptions of operations and techniques described as part of one of the methods 800, 900 may be relevant to the other method. Discussion of various techniques and concepts regarding one of the methods 800, 900 and/or other method may be applicable to one of the other methods, although the scope of embodiments is not limited in this respect.

The methods 800, 900 and other methods described herein may refer to HE APs 502, HE STAs 504 and/or other devices configured to operate in accordance with WLAN standards, 802.11 standards and/or other standards. However, embodiments are not limited to performance of those methods by those components, and may also be performed by other devices, such as an Evolved Node-B (eNB), User Equipment (UE) and/or other. In addition, the methods 800, 900 and other methods described herein may be practiced by wireless devices configured to operate in other suitable types of wireless communication systems, including systems configured to operate according to Third Generation Partnership Project (3GPP) standards, 3GPP Long Term Evolution (LTE) standards, 5G standards, New Radio (NR) standards and/or other standards.

In some embodiments, the methods 800, 900 may also be applicable to an apparatus of an HE AP 502, an apparatus of an HE STA 504 and/or an apparatus of another device. In some embodiments, an apparatus of an HE AP 502 may perform one or more operations of the method 800 and/or other operations. In some embodiments, an apparatus of an HE STA 504 may perform one or more operations of the method 900 and/or other operations.

It should also be noted that embodiments are not limited by references herein (such as in descriptions of the methods 800, 900 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to WLAN, IEEE 802.11, IEEE 802.11ax and/or other. The scope of embodiments is not limited to usage of those elements, however. In some embodiments, different elements, similar elements, alternate elements and/or other elements may be used. The scope of embodiments is also not limited to usage of elements that are included in standards.

In some embodiments, the HE AP 502 may be arranged to operate in accordance with a high-efficiency (HE) wireless local area network (WLAN) protocol. In some embodiments, the HE AP 502 may be configured for unlicensed operation, including but not limited to operation in a 6 GHz operating frequency band. In some embodiments, the HE STA 504 may be arranged to operate in accordance with an HE WLAN protocol. In some embodiments, the HE STA 504 may be configured for unlicensed operation, including but not limited to operation in the 6 GHz operating frequency band.

At operation 805, the HE AP 502 may exchange control signaling with an HE STA 504. In some embodiments, the control signaling may include and/or indicate information related to the operations described herein. In some embodiments, the control signaling may include and/or indicate additional information. In some embodiments, the control signaling may include multiple elements, multiple frames, multiple messages and/or other. For instance, the HE AP 502 may transmit a first element that includes first information and may transmit a second element that includes second information. In some embodiments, the HE AP 502 may perform one or more operations that begin after transmission of the first element and before transmission of the second element.

At operation 810, the HE AP 502 may attempt to detect operation of incumbent devices. At operation 815, the HE AP 502 may determine local transmit power constraints for the HE STA 504. In some embodiments, the HE AP 502 may attempt to detect operation of incumbent devices within the operating bandwidth, within the operating frequency band, or in spectrum adjacent to the operating frequency band. In some embodiments, the HE AP 502 may determine the local maximum transmit power constraints for the HE STA 504 based at least partly on whether the operation of incumbent devices is detected.

In a non-limiting example, the HE AP 502 may, if the operation of incumbent devices is detected in spectrum that is above the operating bandwidth, for the segment of highest frequency within the operating bandwidth, encode the corresponding local maximum transmit power per segment field to indicate a local maximum transmit power that is less than a local maximum transmit power of a segment closest to a center of the operating bandwidth. The HE AP 502 may, if the operation of incumbent devices is detected in spectrum that is below the operating bandwidth: for the segment of lowest frequency within the operating bandwidth, encode the corresponding local maximum transmit power per segment field to indicate a local maximum transmit power that is less than the local maximum transmit power of the segment closest to the center of the operating bandwidth.

At operation 820, the HE AP 502 may transmit a frame. In some embodiments, the HE AP 502 may encode the frame for transmission to the HE STA 504. In some embodiments, the HE AP 502 may encode the frame to include a transmit power envelope element to indicate local maximum transmit power constraints for the HE STA 504 in an operating bandwidth of the HE AP 502 on a per-segment basis for use by the HE STA 504. In some embodiments, the HE AP 502 may encode the frame to include the transmit power envelope element to indicate local maximum transmit power constraints for the HE STA 504 in an operating bandwidth of the HE AP 502 on a per-segment basis for use by the HE STA 504 in responding to a trigger frame (TF) with a trigger-based (TB) HE physical Layer Convergence Procedure (PLCP) Protocol Data Unit (PPDU). In some embodiments, the operating bandwidth may be configurable for division into segments of a configurable segment size. In some embodiments, the operating bandwidth of the HE AP 502 may be in a 6 GHz operating frequency band. In some embodiments, the HE AP 502 may encode the transmit power envelope element to include: A) a transmit power information field that includes: a local maximum transmit power count subfield that indicates the operating bandwidth; and a segment size subfield that indicates the segment size, and B) for each of the segments, a local maximum transmit power per segment field that indicates a local maximum transmit power for the segment.

In some embodiments, the frame that is encoded to include the transmit power envelope element may be a beacon frame, a probe response frame, an association frame, a re-association frame and/or other frame. In some embodiments, the transmit power envelope element may be included in the TF.

In some embodiments, a number of segments encoded for inclusion in the transmit power envelope elements may be equal to a quotient of the operating bandwidth and the segment size.

In some embodiments, the HE AP 502 may encode the local maximum transmit power count subfield as one of: a first value to indicate 20 MHz for the operating bandwidth; a second value to indicate 40 MHz for the operating bandwidth; a third value to indicate 80 MHz for the operating bandwidth; a fourth value to indicate 160 MHz for the operating bandwidth; and/or other value(s).

In some embodiments, the HE AP 502 may encode the local maximum transmit power per segment fields within the transmit power envelope element in accordance with a mapping in which center frequencies of the corresponding segments are ordered in an increasing order.

In some embodiments, the HE AP 502 may encode the local maximum transmit power per segment fields as: a value of zero to indicate that transmission in a segment is disallowed, or a non-zero value to indicate the local maximum transmit power for the segment.

In some embodiments, the operating bandwidth may be one of: 40 MHz, 80 MHz, 160 MHz, and 320 MHz. In some embodiments, the segment size may be 20 MHz. Embodiments are not limited to the above example numbers/sizes of the operating bandwidth or of the segment size.

In some embodiments, the segments may be resource units (RUs) comprising a number of tones spaced by 78.125 kHz. In some embodiments, the number of tones may be one of: 26, 52, and 106. Embodiments are not limited to the above example numbers/sizes of the number of tones or of the spacing between tones.

In some embodiments, the 6 GHz operating frequency band may span from 5935 MHz to 7125 MHz.

At operation 825, the HE AP 502 may transmit a trigger frame (TF). In some embodiments, the HE AP 502 may schedule a trigger-based (TB) HE Physical Layer Convergence Procedure (PLCP) Protocol Data Unit (PPDU) from an HE STA 504 within the operating bandwidth. In some embodiments, the TF may indicate information related to one or more of: time resources to be used for transmission of the HE PPDU by the HE STA 504; frequency resources to be used for transmission of the HE PPDU by the HE STA 504; other information related to transmission of the HE PPDU by the HE STA 504; and/or other information.

At operation 830, the HE AP 502 may receive an HE PPDU from the HE STA 504. In some embodiments, the HE AP 502 may receive the TB HE PPDU from the HE STA 504 in response to the TF. In some embodiments, the TB HE PPDU may be received by the HE AP 502 within the operating bandwidth.

In some embodiments, an apparatus of an HE AP 502 may comprise memory. The memory may be configurable to store information related to the segment size. The memory may store one or more other elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to encoding of the transmit power envelope element. The apparatus may include a transceiver to transmit the transmit power envelope element. The transceiver may transmit and/or receive other blocks, messages and/or other elements.

At operation 905, the HE STA 504 may exchange control signaling with the HE AP 502.

At operation 910, the HE STA 504 may receive a transmit power envelope element. In some embodiments, the transmit power envelope element may be included in a frame received by the HE STA 504, including but not limited to a beacon frame, a probe response frame, an association frame, a re-association frame and/or other frame. In some embodiments, the transmit power envelope element may be included in a TF. At operation 915, the HE STA 504 may receive a TF. At operation 920, the HE STA 504 may determine an adjusted maximum transmit power.

In some embodiments, the HE STA 504 may receive, from the HE AP 502, a transmit power envelope element that includes a "local maximum transmit power for 20 MHz" field that indicates a maximum transmit power in a 20 MHz primary channel. In some embodiments, the HE STA 504 may receive, from the HE AP 502, a TF that schedules transmission of an HE physical layer convergence procedure (PLDP) protocol data unit (HE PPDU) by the HE STA 504. In some embodiments, the TF may indicate a resource unit (RU) size for transmission of the HE PPDU.

In some embodiments, the HE STA 504 may, if the indicated RU size is 242 tones spaced by 78.125 kHz, encode the HE PPDU for transmission in accordance with a transmit power that is less than or equal to the maximum transmit power. In some embodiments, the HE STA 504 may, if the indicated RU size is less than 242 tones: based on the indicated RU size, determine an adjusted maximum transmit power that is lower than the maximum transmit power; and encode the HE PPDU for transmission in accordance with a transmit power that is less than or equal to the adjusted maximum transmit power.

In some embodiments, the HE STA 504 may, if the indicated RU size is 106 tones, determine the adjusted maximum transmit power to be 3 dB less than the maximum transmit power. In some embodiments, the HE STA 504 may, if the indicated RU size is 52 tones, determine the adjusted maximum transmit power to be 6 dB less than the maximum transmit power. In some embodiments, the HE STA 504 may, if the indicated RU size is 26 tones, determine the adjusted maximum transmit power to be 9 dB less than the maximum transmit power.

In some embodiments, the HE STA 504 may, if a bandwidth (BW) field of the TF is set to 40 MHz, 80 MHz or 80+80/160 MHz: if the TF schedules the HE STA on a secondary channel of 20 MHz with an RU size of 242 tones, determine an adjusted maximum transmit power as a maximum transmit power for 40 MHz reduced by 3 dB; if the TF schedules the HE STA on a secondary channel of 20 MHz with an RU size of 106 tones, determine an adjusted maximum transmit power as a maximum transmit power for 40 MHz reduced by 6 dB; if the TF schedules the HE STA on a secondary channel of 20 MHz with an RU size of 52 tones, determine an adjusted maximum transmit power as a maximum transmit power for 40 MHz reduced by 9 dB; and if the TF schedules the HE STA on a secondary channel of 20 MHz with an RU size of 26 tones, determine an adjusted maximum transmit power as a maximum transmit power for 40 MHz reduced by 12 dB.

At operation 925, the HE STA 504 may detect signals from other devices in operating in a protected frequency band. At operation 930, the HE STA 504 may determine one or more parameters related to performance degradation. At operation 935, the HE STA 504 may transmit a multi-band operation (MBO) element. At operation 940, the HE STA 504 may apply transmit filtering to transmissions in the edge channel.

In some embodiments, the HE STA 504 may detect signals from other devices operating in a protected frequency band that is adjacent to an edge channel of an operating frequency band of the HE STA 504. In some embodiments, the HE STA 504 may determine, based on a signal strength measurement of the signals from the other devices, one or more parameters related to performance degradation for edge channel operation. In some embodiments, the HE STA 504 may use transmit filtering to ensure that the HE STA 504 does not interfere with the other devices in the protected frequency band. In some embodiments, the one or more parameters may include: a power backoff, in dB, by which a maximum transmit power for the edge channel would be reduced, as a result of the transmit filtering, in comparison to a center channel of the operating frequency band of the HE STA 504; and a sensitivity increase, in dB, by which a minimum sensitivity for the edge channel is increased, as a result of the transmit filtering, in comparison to the center channel of the operating frequency band of the HE STA 504.

In some embodiments, the HE STA 504 may encode, for transmission to the HE AP 502, a multi-band operation (MBO) element that includes a restriction report element that indicates the determined power backoff and the determined sensitivity increase.

In some embodiments, the HE STA 504 may apply the transmit filtering to transmissions within the edge channel based on the one or more parameters. In some embodiments, the HE STA 504 may apply the transmit filtering to transmissions within the edge channel based on the one or more parameters to reduce interference, from the HE STA 504, to the protected frequency band that is adjacent to the edge channel.

In some embodiments, the HE STA 504 may determine a plurality of power backoffs, on a per-segment basis, for a plurality of segments of the edge channel. In some embodiments, the HE STA 504 may determine a plurality of sensitivity increases, on a per-segment basis, for the plurality of segments of the edge channel. In some embodiments, the HE STA 504 may encode, for inclusion in the MBO element, a restriction report element that includes a per-segment information field for each of the segments. In some embodiments, the per-segment information field for each segment may include: a power backoff field that indicates the corresponding determined power backoff for the segment; and a sensitivity reduction field that indicates the corresponding determined sensitivity increase for the segment.

In some embodiments, the HE STA 504 may determine that a channel of the operating frequency band of the HE STA 504 is non-preferred based on a signal strength of a detected beacon in the channel or a level of detected interference in the channel. In some embodiments, the HE STA 504 may encode the MBO element to indicate: that the channel is non-preferred; and a reason that the channel is non-preferred. In some embodiments, the reason may be related to the signal strength of the detected beacon in the channel or the level of detected interference in the channel.

It should be noted that some embodiments may not necessarily include all operations shown in FIG. 9. In a non-limiting example, the HE STA 504 may perform one or more of operations 910-920, but may not necessarily perform operations 925-940. In another non-limiting example, the HE STA 504 may perform one or more of operations 925-940, but may not necessarily perform operations 910-920.

In some embodiments, an apparatus of an HE STA 504 may comprise memory. The memory may be configurable to store information related to the transmit power envelope element. The memory may store one or more other elements and the apparatus may use them for performance of one or more operations. The apparatus may include processing circuitry, which may perform one or more operations (including but not limited to operation(s) of the method 900 and/or other methods described herein). The processing circuitry may include a baseband processor. The baseband circuitry and/or the processing circuitry may perform one or more operations described herein, including but not limited to decoding of the transmit power envelope element. The AP apparatus may include a transceiver to receive the transmit power envelope element. The transceiver may transmit and/or receive other blocks, messages and/or other elements.

Figure 10:
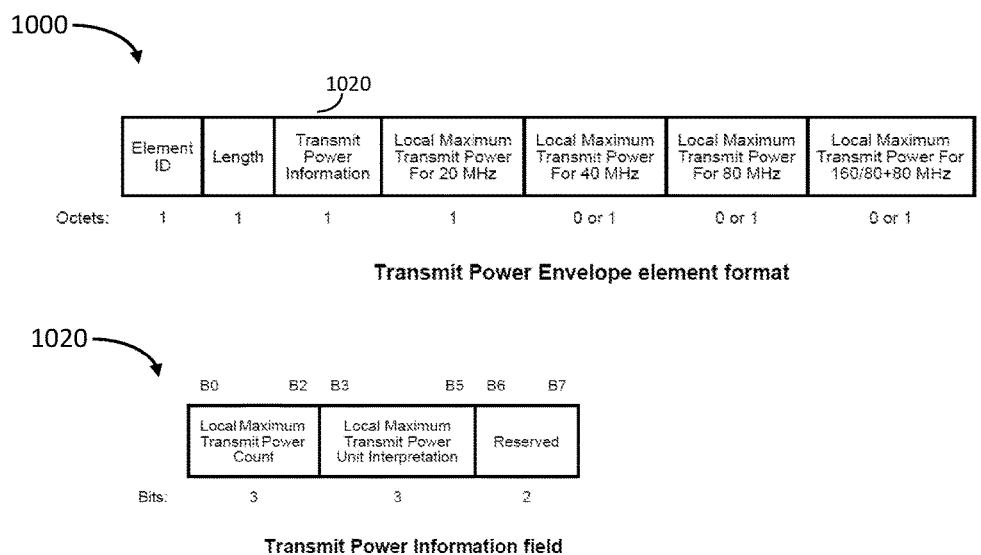
FIG. 10 illustrates example elements and fields in accordance with some embodiments.
Figure 11:
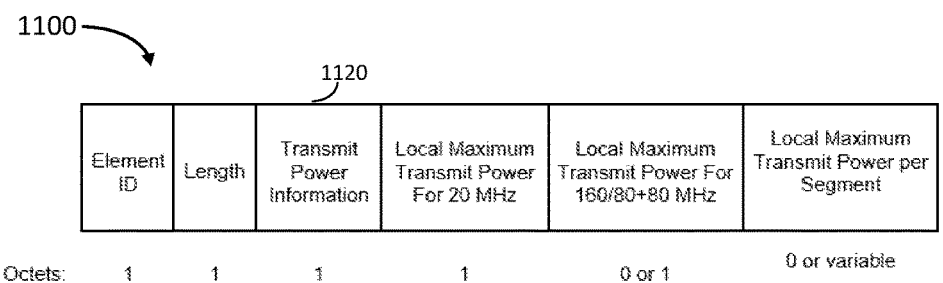
FIG. 11 illustrates example elements and fields in accordance with some embodiments.
Figure 11:
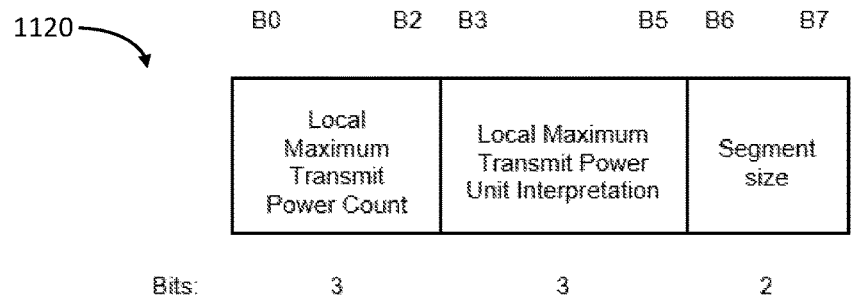
Figure 12:
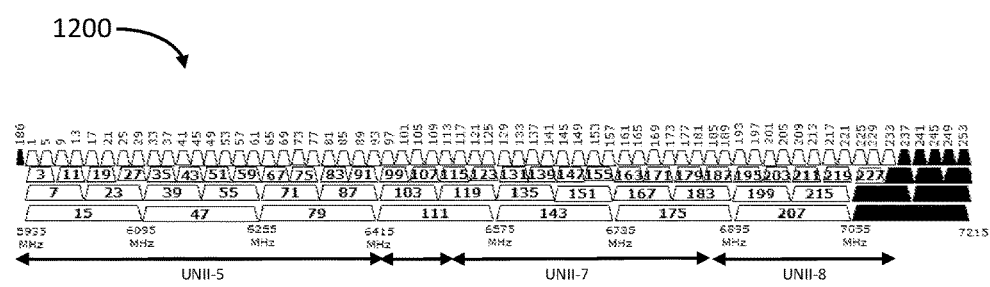
FIG. 12 illustrates example spectrum in accordance with some embodiments.
Figure 13:
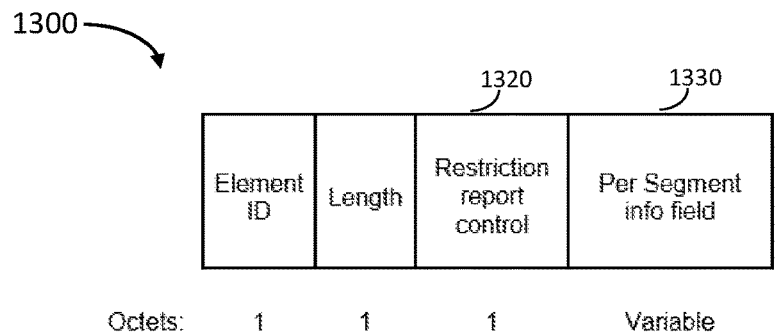
FIG. 13 illustrates example elements and fields in accordance with some embodiments.
Figure 13:
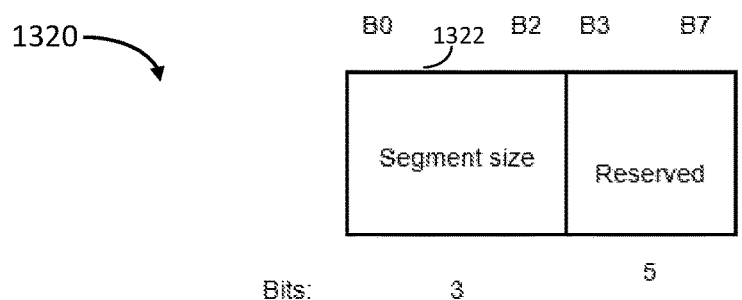
Figure 13:
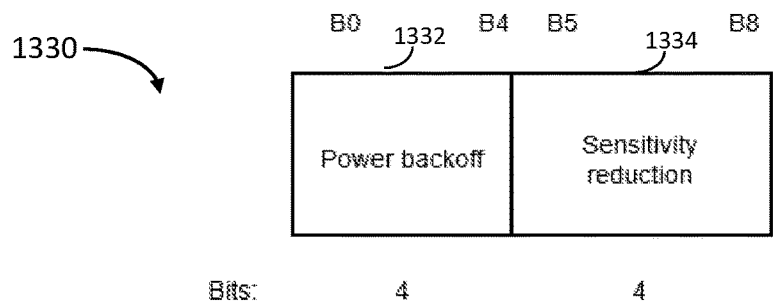
Figure 14:
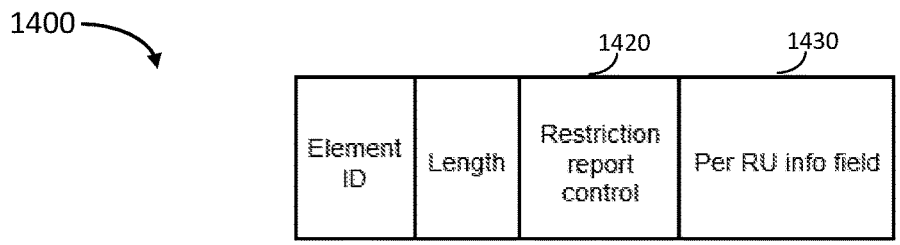
FIG. 14 illustrates example elements and fields in accordance with some embodiments.
Figure 14:
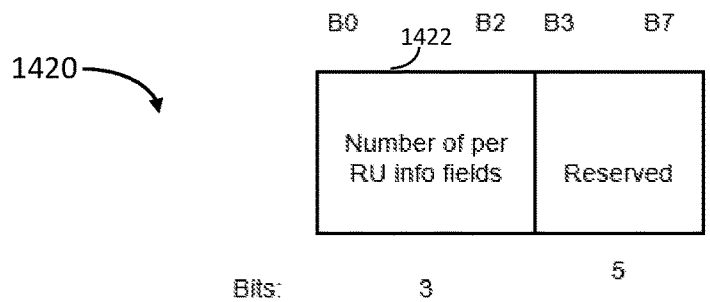
Figure 14:
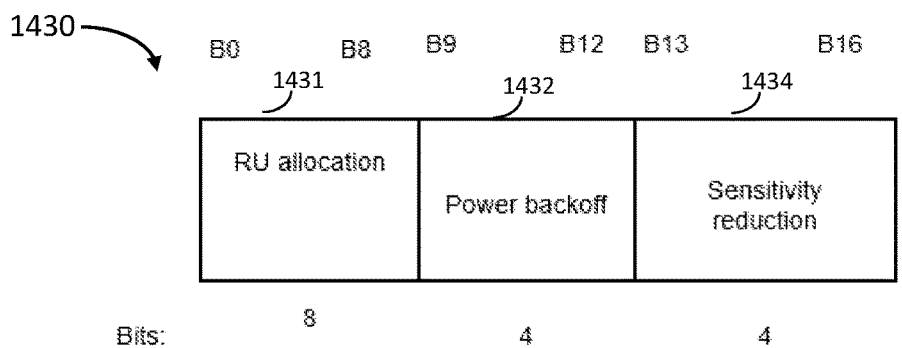

FIG. 10 illustrates example elements and fields in accordance with some embodiments. FIG. 11 illustrates example elements and fields in accordance with some embodiments. FIG. 12 illustrates example spectrum in accordance with some embodiments. FIG. 13 illustrates example elements and fields in accordance with some embodiments. FIG. 14 illustrates example elements and fields in accordance with some embodiments.

It should be noted that the examples shown in FIGS. 10-14 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 10-14. Although some of the elements shown in the examples of FIGS. 10-14 may be included in a WLAN standard, Wi-Fi standard, 802.11 standard, 802.11ax standard and/or other standard, embodiments are not limited to usage of such elements that are included in standards.

In some embodiments, spectrum at 6 GHz for unlicensed operation may be used. In some embodiments, such spectrum may be used for operation in accordance with a standard (including but not limited to 802.11ax). In some embodiments, operation up to 7.125 GHz may be used, which may enable 802.11ax operation in the 6 GHz band, which spans from 5935 MHz to 7125 MHz.

In some cases, there may be incumbents at 6 GHz and unlicensed operation may require the implementation of some mitigation techniques. Some mitigation techniques may forbid the use of specific sub-bands (or different bandwidths depending on the incumbents (between around 400 kHz and around 100 MHz)), or may set a maximum transmit power limit on these sub-bands.

In some embodiments, the AP 102, which is the master, may know these requirements/information, but the STAs 103 may not necessarily know these requirements/information. In some embodiments, a mechanism for the AP 102 to inform the STAs 103 of disallowed channels or of local maximum transmit power constraints may be used.

In some embodiments, the AP 102 can inform the STAs 103 of local maximum transmit power requirements with one or more of the following elements. In one option, a maximum transmit power included in the Country element and/or Power constraint elements may be used. Such solutions may provide a maximum transmit power on the primary channel, but may not necessarily differentiate between different bandwidths. In another option, a maximum transmit power included in the Transmit power envelope element may be used. This may allow the AP 102 to provide different max transmit power for different bandwidths (such as 40, 80, 80+80/160 MHz and/or other).

In some embodiments, the transmit power envelope element 1000 in FIG. 10 may be used. The transmit power information field 1020 is shown in more detail in FIG. 10.

In some cases, the transmit power envelope may not necessarily support restrictions for all the modes that have been defined in 802.11ax, especially for UL TB PPDUs. For instance, if the AP 102 is operating on 80 MHz, but the secondary 20 MHz channel cannot be used, or can only be used with a much lower transmit power, there may not necessarily be any way to indicate that to the STA 103, in some cases.

In some embodiments, signaling may be used by the AP 102 to indicate to the STAs 103 the local maximum transmit power requirement over the BSS operating bandwidth, segment per segment, with segments being of different BW sizes. In some embodiments, the information provided may also span on a larger bandwidth than the BSS operating BW. In some embodiments, the bandwidth of the segments may be lower than the BSS operating BW. In a non-limiting example, typical information may be for 80 MHz BSS operating BW, with local transmit power limits for each 4 segments of 20 MHz.

In some embodiments, the Transmit Power Envelope element may be extended. In some embodiments, an Extended Transmit Power Envelope element may include one or more of: one or more fields to define the segment BW (which may help derive the number of Local Max Transmit Power per segment fields that will be included in the element); one or more fields to define the Local Max Transmit Power for each segment; and/or other.

In some embodiments, the transmit power envelope may not necessarily be changed (in relation to a legacy configuration), but one or more rules may be used for UL TB PPDU, wherein a STA 103 is transmitting on a secondary channel with a lower bandwidth. In a non-limiting example, for a STA 103 transmitting on secondary 20 MHz only in a 40 MHz UL TB PPDU, the rules may be to derive the requirement on power limit for the secondary 20 MHz based on the 40 MHz local max power limit.

In some embodiments, rules may be defined for the STA 103 (associated to the AP 102 or possibly also for unassociated STAs 103 that transmit to this AP 102) that received this element. For instance, a rule may indicate that the STA 103 shall not transmit with a Transmit Power higher than the local Max Transmit Power if it is transmitting on a segment for which the AP has transmitted a Max Transmit Power value.

In some embodiments, a Transmit Power Envelope element may be extended to support local maximum transmit power for up to 320 MHz channels.

In some embodiments, it may be possible to fully disable a segment, a 20 MHz channel, or 40 MHz operation, or 80 MHz operation and/or other within the BSS operating bandwidth. If operation on 40 MHz, 80 MHz, or 160 MHz is disallowed, the transmit power element may not need to be changed. The local transmit power may be encoded as values between −64 dBm and 63 dBm. In some embodiments, the value 0 (which in some cases may be assigned to −64 dBm) may indicate no possible transmissions (which means that the operation is disallowed). In some embodiments, to disallow operation per segments and per subchannels, the changes defined before may be included in the element, and the value 0 for each max transmit power field may indicate that transmissions are disallowed.

In some embodiments, one or more techniques, operations and/or methods described herein may be used to disallow the use of specific channels or RUs within a BSS operating BW, or to restrict the transmit power over these specific channels or RUs.

In some embodiments, one or more per-segment local max transmit powers may be included in a transmit power envelope element. FIG. 11 illustrates a non-limiting example of a transmit Power Envelope element. In some embodiments, the transmit power envelope element 1000 in FIG. 11 may be used. The transmit power information field 1120 is shown in more detail in FIG. 11.

In a non-limiting example, the table below illustrates possible meanings/interpretations of the Local Maximum Transmit Power Count subfield.

| Value | Field(s) present |
|---|---|
| 0 | Local Maximum Transmit Power For 20 MHz. |
| 1 | Local Maximum Transmit Power For 20 MHz and Local Maximum Transmit Power For 40 MHz. |
| 2 | Local Maximum Transmit Power For 20 MHz, Local Maximum Transmit Power For 40 MHz, and Local Maximum Transmit Power For 80 MHz. |
| 3 | Local Maximum Transmit Power For 20 MHz, Local Maximum Transmit Power For 40 MHz, Local Maximum Transmit Power For 80 MHz, and Local Maximum Transmit Power For 160/80 + 80 MHz. For TVHT STAs, reserved. |
| 4-7 | Reserved |

In a non-limiting example, the table below illustrates possible meanings/interpretations of the segment size subfield.

| Value | Field(s) present |
|---|---|
| 0 | No segments |
| 1 | 20 MHz segment |
| 2 | 10 MHz segment |
| 3 | 5 MHz segment |

In some embodiments, the Segment Size may indicate the size of the segments. In some embodiments, the Local Maximum Transmit Power per Segment subfield may be 1 byte size and may indicate the Local Maximum transmit Power for a particular segment. The number of segments included in the Transmit Power Envelope element is equal to a maximum operating bandwidth indicated in the Local maximum Transmit Power Count subfield (0: 20 MHz, 1: 40 MHz, 2: 80 MHz, 4: 160 MHz) divided by the segment size indicated in the Segment Size field. For instance, with 80 MHz BW, and segment size of 20 MHz, there may be 4 Local Maximum Transmit Power per Segment subfields. These subfields may correspond to the multiple segments that compose the operating bandwidth and may be ordered starting from the lower to the higher segment center frequency.

In some embodiments, one or more rules for the STA 103 may be the same as or similar to the following: A) an HE STA that is scheduled to transmit an HE TB PPDU on an RU that is contained in a segment with a local maximum transmit power shall have a transmit power lower than this local maximum transmit power, B) if the RU overlaps on multiple segments, the STA 103 shall have a transmit power lower than both the local maximum transmit power of each segments. In some embodiments, the word "shall" may be replaced by the word "may" in the above rules.

In some embodiments, one or more alternatives may use RUs instead of segments. It may be possible to implement one or more of the techniques, operations and/or methods described herein with other solutions. In some embodiments, a new element or a different extension of a current element may be used. For instance, the segments can be in RUs instead of being in BW: for instance for 80 MHz, the minimum segment can be an RU 106, and we would include a transmit power value for each of the 106 possible RUs in the 80 MHz channel.

In some embodiments, one or more rules may be used to derive the local max Tx Power if scheduled in a RU bandwidth smaller than the BW of the local max transmit power. These rules may be needed for 802.11ax even if the transmit power envelope element is not extended with per-segment or per-RU local maximum transmit power fields. And those rules also may apply if extension per-segment or per-RU is performed.

In a non-limiting example (referred to for clarity, and without limitation, as "Example 1"), BSS operation is 40 MHz; the AP 102 triggers 2 STAs 103 (STA #1 and STA #2); STA #1 transmits UL TB PPDU on the primary 20 MHz channel and STA #2 transmits UL TB PPDU on the secondary 20 MHz channel. In a set of rules (with 20 MHz max Tx power, 40 MHz max Txpower, 80 MHz max TxPower), different options are possible.

In one option (referred to for clarity, and without limitation as "option 1"), an STA 103 that is scheduled on the primary 20 MHz channel may consider its PPDU as being a 20 MHz PPDU and not a 40 MHz PPDU. It may therefore follow the max power limit defined in the 20 MHz max Tx Power limit field (as it is the rules for the primary channel). An STA 103 that is scheduled on the secondary 20 MHz channel may consider its PPDU as being a 20 MHz PPDU and not a 40 MHz PPDU. It cannot follow the rules defined in the 20 MHz max Tx Power limit field (as it is the rules for the primary channel) and has to follow the rules defined in the 40 MHz Max Tx Power limit field. There are then 2 sub-options here: either the STA 103 may simply respect the max power of the 40 MHz field as is (no 3 dB compensation); or the STA 103 may consider that there is a PSD limit (max power per MHz) and that if the PPDU occupies only a portion of the BW, the MAX power limit needs to be adjusted. In such case, the Max power on the secondary 20 MHz would be equal to 40 MHz Max Tx Power Limit—3 dB (3 dB as the BW is 2 times lower).

In another option (referred to for clarity, and without limitation as "option 2"), both STAs 103 may consider their transmission as 40 MHz PPDU and may look only at the 40 MHz Max Transmit power element. Same as for option 1, there may be 2 sub-option to derive the Max Tx Power for the 20 MHz used for option 2.

In a non-limiting example (referred to for clarity, and without limitation, as "Example 2"), BSS operation is 40 MHz, the AP 102 triggers 4 STAs 103, STA #1 transmits UL TB PPDU on a 26 tones RU (2 MHz RU) in the primary 20 MHz channel and STA #2 transmits UL TB PPDU on a 26-tones RU on the secondary 20 MHz channel. In some embodiments, a set of rules may be the same as or similar to material of Example 1, but in addition to it there is the difference that the preamble of the HE TB PPDU is transmitted over 20 MHz, while the data portion is transmitted only on the RU (2 MHz). So the max transmit power limit may be defined with one or more of the following rules. In option 1, consider the PPDU is 20 MHz and follow rules shown in Example 1. In option 2, consider the PPDU is 2 MHz and follow rules shown in Example 1, but with a down scaling of the Max Power assuming 2 MHz instead of 20 MHz.

In some embodiments, if for NBT, the preamble that is transmitted on 20 MHz is suppressed, the PPDU size may be considered as being 2 MHz and not 20 MHz, and the rules may evolve, compared to 20 MHz.

In some embodiments, a maximum transmit power of an HE STA 103 for the transmission of an HE TB PPDU is defined in accordance with one or more of the following. A) If the STA 103 received a Transmit Power Envelope element, and the STA 103 is scheduled on the primary 20 MHz channel with a 242-tone RU, the STA 103 shall have a transmit power lower or equal to the Local Maximum Transmit Power For 20 MHz field. B) If the STA 103 received a Transmit Power Envelope element, and the STA 103 is scheduled on the primary 20 MHz channel with a 106-RU, a 52-RU or a 26-RU, the STA 103 shall have a transmit power lower or equal to the Local Maximum Transmit Power For 20 MHz field minus respectively 3, 6, 9 dB. C) If the STA 103 received a Transmit Power Envelope element, the trigger frame has a BW field set to 40 Mhz, 80 or 80+80/160 MHz and the STA 103 is scheduled on the secondary 20 MHz channel with a 242-RU, 106-RU, a 52-RU or a 26-RU, the STA 103 shall have a transmit power lower or equal to the Local Maximum Transmit Power For 40 MHz field minus respectively 3, 6, 9, 12 dB. D) If the STA 103 received a Transmit Power Envelope element, the trigger frame has a BW field set to 80 or 80+80/160 MHz and the STA 103 is scheduled on the secondary 40 MHz channel with a 484-RU, 242-RU, 106-RU, a 52-RU or a 26-RU, the STA 103 shall have a transmit power lower or equal to the Local Maximum Transmit Power For 80 MHz field minus respectively 3, 6, 9, 12, 15 dB. E) If the STA 103 received a Transmit Power Envelope element, the trigger frame has a BW field set to 80+80/160 MHz and the STA 103 is scheduled on the secondary 80 MHz channel with a 996-RU, 484-RU, 242-RU, 106-RU, a 52-RU or a 26-RU, the STA shall have a transmit power lower or equal to the Local Maximum Transmit Power For 80 MHz field minus respectively 3, 6, 9, 12, 15 and 18 dB.

In some embodiments, 320 MHz operation may be supported. In some embodiments, the table above (which illustrates possible meanings/interpretations of the Local Maximum Transmit Power Count subfield) may be changed by addition of a new value to indicate the following: Local Maximum Transmit Power For 20 MHz, Local Maximum Transmit Power For 40 MHz, Local Maximum Transmit Power For 80 MHz, Local Maximum Transmit Power For 160/80+80 MHz, and Local Maximum Transmit Power for 320 MHz/160+160 MHz.

In some cases, spectrum at 6 GHz may be available for unlicensed operation. In some embodiments, the spectrum may extend to 7.125 GHz, which may enable 802.11ax operation in the 6 GHz band, which spans from 5935 MHz to 7125 MHz (as shown in 1200 in FIG. 12).

In some cases, there is currently only 10 MHz of guard band with the ITS band. It is therefore likely that some Wi-Fi devices will have issues to operate on the channels on the edge of the spectrum (channel 1, 5, 3, 7, 15). Because of filtering, in order not to transmit energy on the ITS band, or to not receive energy from the ITS band, the transmit power of the STA 103 may be strongly reduced when operating on the edge, and the receive sensitivity can also be impacted.

In some embodiments, the STA 103 may inform the APs 102 of non-preferred channels, as defined in the MBO (multi-band operation) specification, which is mandatory for 11ax. The STA 103 may include the MBO element in its probe, (re)association request frames, and include the non-preferred channel report attribute shown below, which may include all the channel numbers on which the STA 103 does not want to operate or would prefer not to operate.

| Field Name | Size (Octets) | Value | Description |
| --- | --- | --- | --- |
| Attribute ID | 1 | 0x02 | Identifies Non-preferred Channel Report |
| Length | 1 | 0x00 or Variable | Length of the following fields in the attribute in octets. |
| Operating Class | 1 | Variable | Operating Class contains an enumerated value from Annex E of [3], specifying the operating class in which the Channel List is valid. |
| Channel List | Variable | Variable | The Channel List contains a variable number of octets, where each octet describes a single channel number. Channel numbering is dependent on Operating Class according to Annex E. |
| Preference | 1 | 0-255 | Indicates a preference ordering for the above set of channels, as defined in Table 4-7. |
| Reason Code | 1 | 0-255 | Indicates the reason that the MBO STA prefers not to operate in this band/channel, refer to Table 4-8. |
| Reason Detail | 1 | Variable | Provides details associated with the reason indicated by the Reason Code, refer to Table 4-9 |

Values of the Preference field are defined in the table below.

| Value | Description |
| --- | --- |
| 0 | Excluded channel. Indicates a band/channel on which the MBO STA will not operate |
| 1-2 | Relative values used to indicate the non-preferred ordering of channels in which a MBO STA would prefer not to operate, with 1 indicating the least preferred and ascending values indicating more acceptability |
| 3-255 | Reserved |

Values of the Reason Code field are defined below.

| Value | Name | Reason Detail | Description |
|---|---|---|---|
| 0 | Unspecified | Unspecified | Unspecified reason |
| 1 | Beacon Strength | RSSI | Beacon frames being received at too low a signal strength from the BSS operating in this channel |
| 2 | Co-located Interference | None | An unacceptable level of interference is being experienced by the MBO STA in this channel |
| 3 | In-device Interferer | None | The MBO STA has another active connection in this channel, or near enough to this channel to cause operating interference |
| 4-255 | Reserved | Reserved | Rescued |

In some embodiments, the above solution may enable a device to perform one or more operations, such as indicating that it cannot operate on channel 1, 5, 3, 7, 15 for instance. However, this does not provide the information with sufficient granularity. For instance, the device could operate on channel 15 (160 MHz channel), if it operates on the 80 MHz channel 23 instead of 7, and similarly for other smaller sub-channels.

In some embodiments, the STA 103 may report to an AP 102 a more precise description of its limitations when operating on specific channels that are adjacent to protected bands. This is the case for the channels on the lower edge of the 6 GHz spectrum (right above the ITS band). This can also be the case for any type of incumbents that can cause a subband within the 6 GHz spectrum to be disallowed, and on which no energy above a certain threshold can be transmitted.

Example limitations may be described in terms of: max transmit power in dBm or power backoff compared to typical max power in dB; new Rx sensitivity in dBm or Rx sensitivity degradation compared to typical sensitivity in dB; other elements can be included, such as specific capabilities that apply or not specifically on the particular segment/RU. The limitations may be given per frequency segment over the BSS operating BW (the BSS operating BW is divided in multiple frequency segments and the information is provided for each segment, or at least for each segment for which the parameters are changed because of the neighbor channel). For instance, the element or the frame carrying the information has a field describing the size of the frequency segment, and based on that size and the BSS operating BW, there are a specific number of "per segment info fields" carrying the information. Alternatively, the information is provided per resource unit RU (assuming the RU distributions for the BSS operating BW), and the element contains per RU info field (there can be multiple of them), which include the power and sensitivity information, as well as the RU allocation value to identify for which RU the information relates to.

Note that this information can also be given in a generic manner assuming an adjacent channel that requires filtering. In such case, the segments are defined by how much they are separated from the edge of the filtered channel. For instance, the first segment is between 0 and 10 MHz, $2^{nd}$ between 10 and 20 MHz, etc. This information would apply to the edge of the 6 GHz band for instance, or more specifically to 5925 MHz (edge of the ITS band), or could apply to a channel that is disallowed because of an incumbent in the middle of the 6 GHz spectrum. This information can be carried in a new frame and/or a new element, and be included in probe requests, (re)association frames. It can also be carried in an evolved version of the MBO element, by defining either a new attribute, or new fields in the non-preferred channel attribute.

In some cases, through usage of techniques described above, an access point (BSS) or a network (ESS) can effect better decisions regarding BSS, Channel, and RU allocations to associated STAs 103 and STAs 103 asking to associate to the AP/Network, to optimize overall network performance, understanding the PHY level limitations of each STA 103 with respect to specific channels or parts of channels.

In one option (which may be referred to for clarity, and without limitation, as "option 1b"), the element or the attribute in MBO element that carries this information can be defined as follows (and illustrated in FIG. 13), for the option in which the information is provided for segments within the BSS BW. The element 1300 is an example of a restriction report element or attribute, and includes a restriction report control field 1320 (which is shown in more detail in FIG. 13) and a variable number of per segment info fields 1330 (which are shown in more detail in FIG. 13). The Segment size field 1320 indicates the BW of the segments. The BSS BW is divided in "BSS BW/segment BW" segments, and the element contains "BSS BW/segment BW" per segment info fields 1330, that are included in the element in order, starting with the segment with the lowest center frequency and ending with the segment with the highest center frequency. Possibly, if there are less per segment info field, that means that the power backoff and the sensitivity reduction fields are equal to 0 for the missing segments. The Power Backoff field 1332 indicates the amount of dB by which the max transmit power for this segment is reduced compared to the max transmit power of the device on a similar segment when there are no filtering performance reductions. The Sensitivity reduction field 1334 indicates the amount of dB by which the minimum sensitivity is increased for this segment compared to the sensitivity level of the device on a similar segment when there are no filtering performance reductions.

In another option (which may be referred to for clarity, and without limitation, as "option 2b"), the element or the attribute in MBO element that carries this information can be defined as follows (and illustrated in FIG. 14), for the option in which the information is provided for specific RUs within the BSS BW. The element 1400 is an example of a restriction report element or attribute, and includes a restriction report control field 1420 (which is shown in more detail in FIG. 14) and a variable number of per RU info fields 1430 (which are shown in more detail in FIG. 14). The Number of Per RU info fields field 1422 indicates the number of RUs for which specific restriction information is provided. The RU allocation field 1431 indicates the ID of the RU for which the information is provided. It will usually be the RU on the lower or upper edge of the channel, and it can be a 26-tone RU, a 52-tone RU, or any other RU sizes. The Power Backoff field 1432 indicates the amount of dB by which the max transmit power for this RU is reduced compared to the max transmit power of the device on a RU of similar BW when there are no filtering performance reductions. The Sensitivity reduction field 1434 indicates the amount of dB by which the minimum sensitivity is increased for this RU compared to the sensitivity level of the device on an RU of similar BW when there are no filtering performance reductions.

In another option (which may be referred to for clarity, and without limitation, as "option 3b"), the element or the attribute in MBO element that carries this information can be defined as follows, for the option in which the information is provided in a generic manner for specific segments in the entire band. In such case, we can use either option 1b or option 2b in the sense that we provide the information per segment or per RU. But we add the information of the operating class and channel number on which this information applies. The control info includes the operating class. For option 1b adaptation, the per-segment info field includes also the channel number on which this segment applies. Note that another option is to define per-channel info field, which include multiple per-segment info fields. For option 2b adaptation, the per-RU info field includes also the channel number on which this RU applies. Note that another option is to define per-channel info field, which include multiple per-RU info fields.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high efficiency (HE) access point (AP), the apparatus comprising: memory; and processing circuitry, configured to:
    encode a frame for transmission, the frame encoded to include a transmit power envelope element to indicate local maximum transmit power constraints for an operating bandwidth of the HE AP on a per-segment basis, wherein the operating bandwidth is configurable for division into segments of a configurable segment size, wherein the operating bandwidth of the HE AP is in a 6 GHz operating frequency band,
    wherein the processing circuitry is further configured to encode the transmit power envelope element to include:
        a transmit power information field that includes:
            a local maximum transmit power count subfield that indicates the operating bandwidth, and
            a segment size subfield that indicates the segment size, and
        for each of the segments, a local maximum transmit power per segment field that indicates a local maximum transmit power for the segment;
    encode, for transmission, a trigger frame (TF) that schedules a trigger-based (TB) HE Physical Layer Convergence Procedure (PLCP) Protocol Data Unit (PPDU) from an HE station (HE STA) within the operating bandwidth; and
    decode the TB HE PPDU from the HE STA in response to the TF, the TB HE PPDU received by the HE AP within the operating bandwidth,
    wherein the memory is configured to store information related to the segment size.

2. The apparatus according to claim 1, wherein the frame that is encoded to include the transmit power envelope element is a beacon frame, a probe response frame, an association frame, or a re-association frame.

3. The apparatus according to claim 1, wherein:
    the HE AP is configured for unlicensed operation in the 6 GHz operating frequency band,
    the processing circuitry is further configured to:
        attempt to detect operation of incumbent devices within the operating bandwidth, within the operating frequency band, or in spectrum adjacent to the operating frequency band; and
        determine the local maximum transmit power constraints for the HE STA based at least partly on whether the operation of incumbent devices is detected.

4. The apparatus according to claim 3, the processing circuitry further configured to:
    if the operation of incumbent devices is detected in spectrum that is above the operating bandwidth:
        for the segment of highest frequency within the operating bandwidth, encode the corresponding local maximum transmit power per segment field to indicate a local maximum transmit power that is less than a local maximum transmit power of a segment closest to a center of the operating bandwidth; and
    if the operation of incumbent devices is detected in spectrum that is below the operating bandwidth:
        for the segment of lowest frequency within the operating bandwidth, encode the corresponding local maximum transmit power per segment field to indicate a local maximum transmit power that is less than the local maximum transmit power of the segment closest to the center of the operating bandwidth.

5. The apparatus according to claim 1, wherein a number of segments encoded for inclusion in the transmit power envelope elements is equal to a quotient of the operating bandwidth and the segment size.

6. The apparatus according to claim 1, the processing circuitry further configured to:
    encode the local maximum transmit power count subfield as one of:
        a first value to indicate 20 MHz for the operating bandwidth,
        a second value to indicate 40 MHz for the operating bandwidth,
        a third value to indicate 80 MHz for the operating bandwidth,
        a fourth value to indicate 160 MHz for the operating bandwidth.

7. The apparatus according to claim 1, the processing circuitry further configured to:
    encode the local maximum transmit power per segment fields within the transmit power envelope element in accordance with a mapping in which center frequencies of the corresponding segments are ordered in an increasing order.

8. The apparatus according to claim 1, the processing circuitry further configured to:
    encode the local maximum transmit power per segment fields as:
        a value of zero to indicate that transmission in a segment is disallowed, or a non-zero value to indicate the local maximum transmit power for the segment.

9. The apparatus according to claim 1, wherein:
the operating bandwidth is one of: 40 MHz, 80 MHz, 160 MHz, and 320 MHz, and
the segment size is 20 MHz.

10. The apparatus according to claim 1, wherein:
the segments are resource units (RUs) comprising a number of tones spaced by 78.125 kHz, and
the number of tones is one of: 26, 52, and 106.

11. The apparatus according to claim 1, wherein the 6 GHz operating frequency band spans from 5935 MHz to 7125 MHz.

12. The apparatus according to claim 1, wherein:
the processing circuitry includes a baseband processor to encode the transmit power envelope element, and
the apparatus includes a transceiver to transmit the transmit power envelope element.

13. A non-transitory computer-readable storage medium that stores instructions for execution by processing circuitry to perform operations for communication by a high efficiency (HE) station (HE STA), the operations to configure the processing circuitry to:
decode, from an HE access point (HE AP), a transmit power envelope element that includes a "local maximum transmit power for 20 MHz" field that indicates a maximum transmit power in a 20 MHz primary channel;
decode, from the HE AP, a trigger frame (TF) that schedules transmission of an HE physical layer convergence procedure (PLDP) protocol data unit (HE PPDU) by the HE STA, wherein the TF indicates a resource unit (RU) size for transmission of the HE PPDU;
if the indicated RU size is 242 tones spaced by 78.125 kHz, encode the HE PPDU for transmission in accordance with a transmit power that is less than or equal to the maximum transmit power; and
if the indicated RU size is less than 242 tones:
based on the indicated RU size, determine an adjusted maximum transmit power that is lower than the maximum transmit power; and
encode the HE PPDU for transmission in accordance with a transmit power that is less than or equal to the adjusted maximum transmit power.

14. The non-transitory computer-readable storage medium according to claim 13, the operations to further configure the processing circuitry to:
if the indicated RU size is 106 tones, determine the adjusted maximum transmit power to be 3 dB less than the maximum transmit power;
if the indicated RU size is 52 tones, determine the adjusted maximum transmit power to be 6 dB less than the maximum transmit power; and
if the indicated RU size is 26 tones, determine the adjusted maximum transmit power to be 9 dB less than the maximum transmit power.

15. The non-transitory computer-readable storage medium according to claim 13, the operations to further configure the processing circuitry to:
if a bandwidth (BW) field of the TF is set to 40 MHz, 80 MHz or 80+80/160 MHz:
if the TF schedules the HE STA on a secondary channel of 20 MHz with an RU size of 242 tones, determine an adjusted maximum transmit power as a maximum transmit power for 40 MHz reduced by 3 dB;
if the TF schedules the HE STA on a secondary channel of 20 MHz with an RU size of 106 tones, determine an adjusted maximum transmit power as a maximum transmit power for 40 MHz reduced by 6 dB;
if the TF schedules the HE STA on a secondary channel of 20 MHz with an RU size of 52 tones, determine an adjusted maximum transmit power as a maximum transmit power for 40 MHz reduced by 9 dB; and
if the TF schedules the HE STA on a secondary channel of 20 MHz with an RU size of 26 tones, determine an adjusted maximum transmit power as a maximum transmit power for 40 MHz reduced by 12 dB.

16. The non-transitory computer-readable storage medium according to claim 13, wherein the transmit power envelope element is received in a beacon frame, a probe response frame, an association frame, or a re-association frame.

17. An apparatus of a high efficiency (HE) station (HE STA), the apparatus comprising: memory; and processing circuitry, configured to:
detect signals from other devices operating in a protected frequency band that is adjacent to an edge channel of an operating frequency band of the HE STA;
determine, based on a signal strength measurement of the signals from the other devices, one or more parameters related to performance degradation for edge channel operation, wherein transmit filtering would be used to ensure that the HE STA does not interfere with the other devices in the protected frequency band, wherein the one or more parameters include:
a power backoff, in dB, by which a maximum transmit power for the edge channel would be reduced, as a result of the transmit filtering, in comparison to a center channel of the operating frequency band of the HE STA, and
a sensitivity increase, in dB, by which a minimum sensitivity for the edge channel is increased, as a result of the transmit filtering, in comparison to the center channel of the operating frequency band of the HE STA;
encode, for transmission to an HE access point (HE AP), a multi-band operation (MBO) element that includes a restriction report element that indicates the determined power backoff and the determined sensitivity increase; and
apply the transmit filtering to transmissions within the edge channel based on the one or more parameters.

18. The apparatus according to claim 17, the processing circuitry further configured to:
apply the transmit filtering to transmissions within the edge channel based on the one or more parameters to reduce interference, from the HE STA, to the protected frequency band that is adjacent to the edge channel.

19. The apparatus according to claim 17, the processing circuitry further configured to:
determine a plurality of power backoffs, on a per-segment basis, for a plurality of segments of the edge channel;
determine a plurality of sensitivity increases, on a per-segment basis, for the plurality of segments of the edge channel;
encode, for inclusion in the MBO element, a restriction report element that includes a per-segment information field for each of the segments,
wherein the per-segment information field for each segment includes:
a power backoff field that indicates the corresponding determined power backoff for the segment, and a sensitivity reduction field that indicates the corresponding determined sensitivity increase for the segment.

20. The apparatus according to claim 17, wherein:
the edge channel is a first channel,
the processing circuitry is further configured to:
   determine that a second channel of the operating frequency band of the HE STA is non-preferred based on a signal strength of a detected beacon in the second channel or a level of detected interference in the second channel;
encode the MBO element to indicate:
   that the second channel is non-preferred, and
   a reason that the second channel is non-preferred, wherein the reason is related to the signal strength of the detected beacon in the second channel or the level of detected interference in the second channel.

* * * * *